March 31, 1953 G. B. FETROW ET AL 2,632,978
METHOD AND APPARATUS FOR HEATING ORCHARDS AND THE LIKE
Filed April 12, 1949 2 SHEETS—SHEET 1

INVENTORS
Gene B. Fetrow
BY & John B. Browning
Stedman B. Hoar
agent

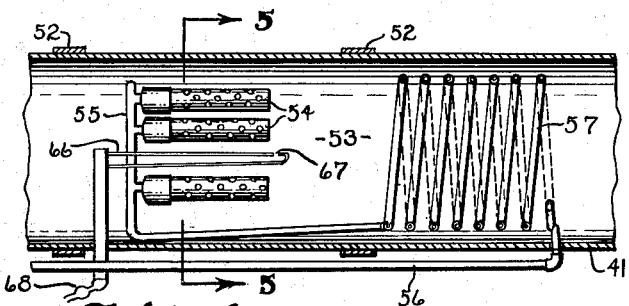
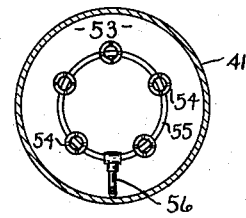
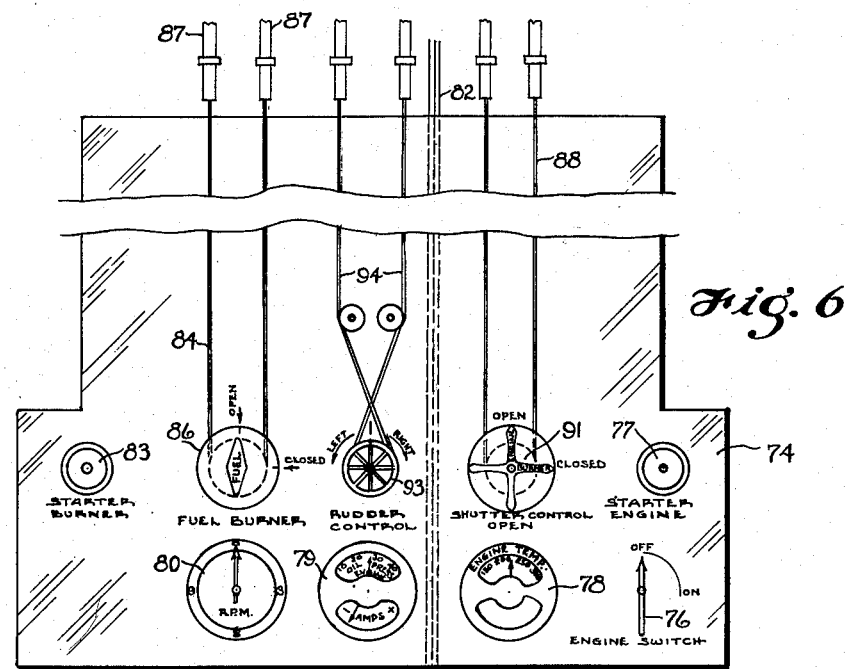
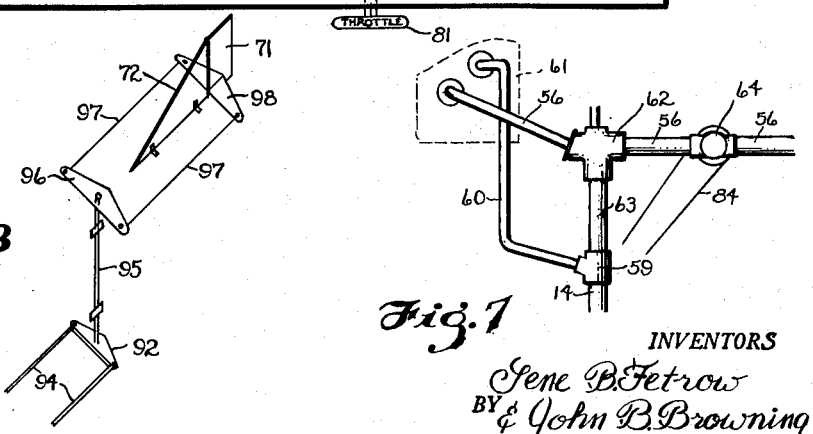

Patented Mar. 31, 1953

2,632,978

UNITED STATES PATENT OFFICE 2,632,978

METHOD AND APPARATUS FOR HEATING ORCHARDS AND THE LIKE

Gene B. Fetrow and John B. Browning, Ontario, Calif.

Application April 12, 1949, Serial No. 86,962

13 Claims. (Cl. 47—2)

This invention relates to a method for heating large out-of-door areas such as orchards and the like, and to apparatus for carrying such a method into effect.

Experimenters have claimed that air turbulence has an important effect in protecting orchards from frost-damage. When the temperature close to the ground level has been only a few degrees below the danger point for crops or fruit, wind-machines have been able to prevent freezing of the crops by stirring the atmosphere. However, the official opinion of most agricultural stations seems to be that wind, of and by itself, has little beneficial effect and that the good results claimed for it are due to blowing cold air from stagnant pockets and areas into which cold air has an opportunity to settle, and to mixing warmer upper strata with the cold strata close to the ground. In short, it is necessary to have heat available before wind machines can move it to places where it is needed.

On the other hand there is no doubt that in the ordinary method of heating orchards by firepots set among the trees, a great deal of heat is wasted. Radiant heat benefits the trees in the immediate vicinity of a heater pot, but the hot products of combustion and the air heated by mixture therewith rise above the trees and may be dissipated without benefit. For that reason, and in spite of anti-smoke ordinances, many orchardists operate their heater-pots at low efficiency of combustion in order to produce a pall of smudge which will overhang the trees and by discouraging vertical air currents will confine the developed heat to a useful area. This method is not only dirty but wasteful of the heat potentialities of the fuel. More progressive and law-abiding orchardists attempt to replace by better combustion the heat lost to upper levels when the smudge is minimized, and numerous types of heater pots have been developed to burn with relative cleanliness and with high heat output, both radiant and convective. These improved pots usually operate on the principle of forced or induced drafts of air preheated by contact with a stack which forms an extended combustion chamber, it being generally recognized that the cause of smudge has been lack of preheated oxygen to vaporize the fuel and to support combustion, and lack of adequate combustion space. But these improved heater pots, set among closely planted trees, still send their blasts vertically and waste heat to upper levels. Because of this waste, the number of pots required to heat, say, a ten-acre orchard, represents a heavy capital investment and entails a heavy operating expense in labor as well as in fuel.

It is an object of this invention to provide a method for heating orchards and similar large out-of-door areas which is of high efficiency, clean, and low in cost of operation.

A more detailed object of the invention is to provide a method of heating combining the principles of heat generation and of air-stream generation, in which generation of the air stream not only results in distribution of the heat but also promotes and sustains the generation of the heat.

A further object of the invention is to provide a method of heating in which an air-stream aids in the generation of heat, propels horizontally the heat so generated so as to cause the heat to be effective close to ground-levels, and sweeps an extensive area centered upon the heat-generating unit, the sweeping action being induced by the force of the air-stream itself and not requiring additional mechanical force.

Still another object of the invention is to provide apparatus and suitable controls therefor for carrying into effect the above described method of heating, in a simple and efficient manner.

More specifically, it is an object of the invention to provide a burner of high efficiency and capacity and adapted to produce a strong blast of heat, in combination with an engine adapted to force air to the heating apparatus, to support combustion therein by heating the forced air, and to distribute the heat blast over the surrounding area.

It is also an object of this invention to provide apparatus comprising an engine and a burner elevated above the ground and at a distance from the fuel supply for the burner, which may be controlled from ground level to cause the engine to ignite the burner, supply preheated air for support of combustion in the burner, supply liquid fuel under pressure if liquid fuel is to be used in the burner, and blow the heat in any desired horizontal direction.

Other advantages and objects of the invention will be pointed out as the following description of a preferred embodiment of our invention proceeds, or will be apparent from consideration of the accompanying drawings illustrative of that embodiment, in which:

Fig. 4 is a vertical longitudinal sectional view through a portion of a burner suitable for use with liquid fuel, the portion so illustrated being generally indicated by the bracket 4 of Fig. 1, and being somewhat enlarged;

Fig. 5 is a vertical transverse sectional view of the burner, taken on the line of section 5—5 of Fig. 4;

Fig. 6 is a frontal elevational view of a control panel and is illustrative of the system of controls by which the engine and burner are regulated to carry out our method of heating;

Fig. 7 is an elevational view of details of a preferred fuel supply system for the burner applicable to the use of liquid fuels showing the method of regulating the quantity of fuel delivered to the burner; and Fig. 8 is a perspective view of the control system for the vertical rudder by which rotational movement of the apparatus is achieved.

Figure 1:
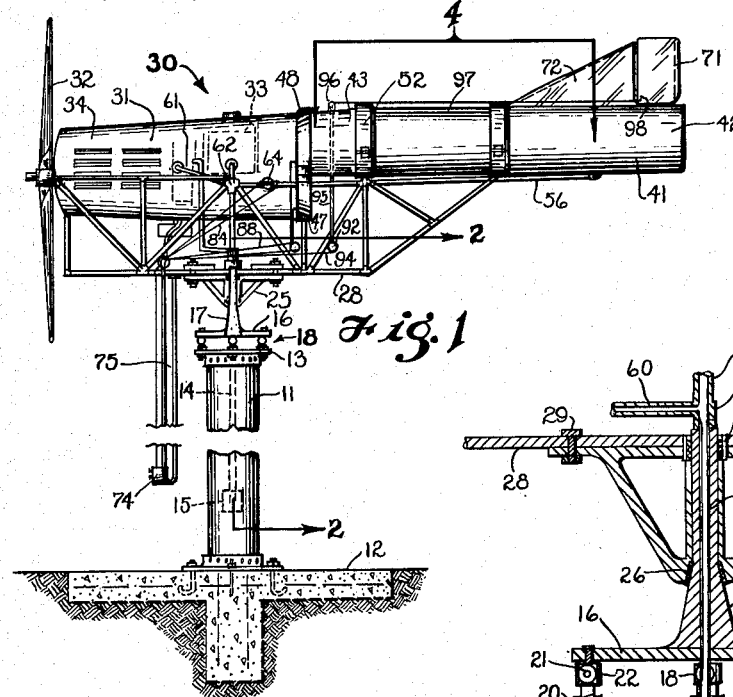
Fig. 1 is a view in side elevation of apparatus adapted to carry out our method of heating.
Figure 2:
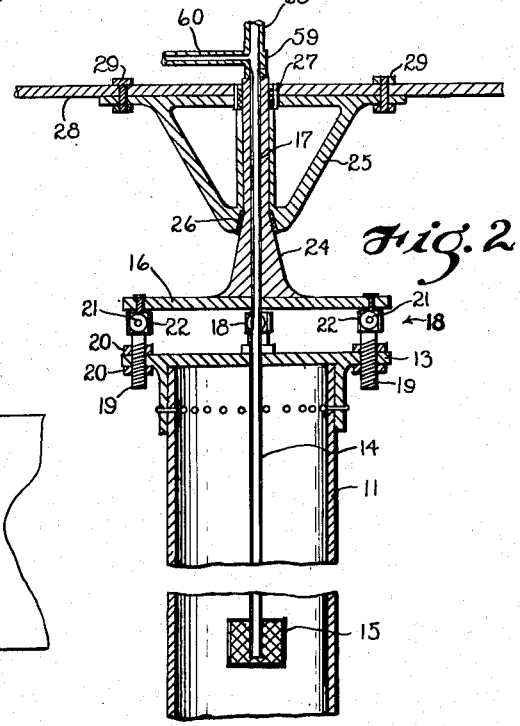
Fig. 2 is a vertical sectional view taken on the line 2—2 of Fig. 1 and illustrative of means for levelling the apparatus and permitting rotative movement thereto.
Figure 3:
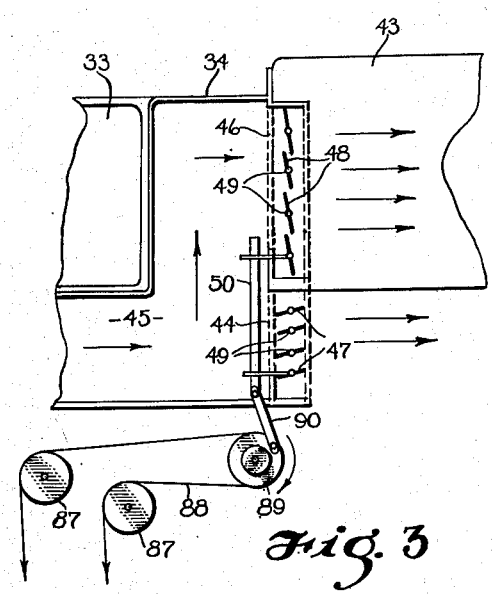
Fig. 3 is a diagrammatic view of air-ducts connecting the engine of the apparatus to the burner, and is illustrative of the controls for delivering more or less heated air to the burner.

Broadly described, our invention is embodied in a combined wind-machine and heater which is elevated above the orchard or other area which it is to protect from frost and which is rotatably mounted as a unit and is provided with a rudder or vertical airfoil which, by resistance to the air-blast generated by the machine, causes the machine and heater to rotate horizontally so as to sweep the area with a heated stream of air, while the power and heat of the engine are also used to ignite, sustain and promote combustion in the heater. The engine of the wind-machine is preferably an engine of the type used in small aeroplanes, having an air-cooling system and an air-screw or propeller and a gasoline fuel tank supported on the engine frame directly behind the engine fire-wall so as to form a light and compact power-generator. Many of such engines, of different makes and varying in details of construction, are available at reasonable cost, having served their useful life in aeroplanes but still having many hours of potential use in service such as is herein contemplated. It is to be understood that any suitable engine capable of turning an air-screw may be embodied in our invention, and also any heat transfer system by which air may be heated by waste heat drawn from the engine, whether directly or through an intermediate cooling system, the term "air-cooled" in the appended claims referring to any type of engine dependent on air as a carrier of waste heat.

Likewise any suitable type of heater may be embodied in the invention, although, because conventional orchard heaters are designed to throw their flames upwardly while the heater in our invention preferably throws its flame horizontally, we have shown a simple tubular heater which possibly would not conform in performance with anti-smudge ordinances except for the assistance which it derives from the engine. The engine is so arranged with respect to the heater that it may preheat the latter, pump fuel to it if liquid fuel is used, ignite the fuel, and supply the heater with pre-heated air to whatever extent is required to support combustion at varying rates of operation. Suitable controls for regulating the operation of the engine and of the heater and their correlated functions, are dependent from the rotatably mounted unit to a position where they may be easily manipulated by an operator on the ground.

Having reference now to the details of the drawings, we have shown a supporting member 11 set on a suitable foundation 12 and extending upwardly to any height sufficient to bring its upper head 13 substantially at or above the top of the surrounding vegetation. If liquid fuel, such as oil, is to be used for the generation of heat, the supporting member 11 may suitably be a stand-pipe serving as a reservoir for the fuel. A fuel conduit 14 is inserted into the stand-pipe 11 through the head 13 and may terminate at its lower end in a sludge screen 15. The conduit 14 extends upwardly from the standpipe 11 through a leveling table 16 and through a bearing shaft 17 which extends vertically from the table 16 when the latter is level. To level the table 16, suitable devices 18 are provided which may be similar to the leveling mechanism of a transit head, only on a larger scale, and may comprise screws 19 slidably mounted in the head 13 and threaded through nuts 20 so as to be adjustable relatively to the head 13, and acting upon the table 16 through ball heads 21 contained in sockets 22.

The lower portion 24 of the bearing shaft 17 may be conical so as to form a thrust bearing for a spider 25 rotatably mounted thereon and provided with anti-friction bearings 26 and with additional anti-friction bearings 27 engaging the upper end of the shaft 17. A general frame structure 28, bolted to the spider 25 by bolts 29, supports the combined wind-machine and heater unit 30.

The wind-machine portion of the unit 30 comprises, as aforesaid, an engine 31 and an airscrew 32 driven thereby, and is preferably so mounted on the frame 28 that the fuel tank 33 of the engine is directly above the bearing shaft 17. Thus a change in the quantity of fuel in the tank 33 will not upset the balance of the unit 30. The engine 31, as depicted in Fig. 1, has a cowl 34 for promoting the flow of air along the heated surfaces of the engine, to cool the engine in the customary manner and in accordance with this invention to provide a supply of preheated air. The air-screw 32 rotates so as to propel an air-stream towards the engine, as in a puller-type aeroplane, some of the air entering the cowl 34 and the greater part of the airstream traveling parallel to the axis of the engine and outside of the cowl.

An orchard type heater 41 is mounted on the frame 28 with its discharge end 42 in the path of the air-stream from the air-screw and pointed in the direction of travel of the air-stream. It will be seen that this alignment of the heater 41 and the engine 31 causes the flow of gases in the heater to be aided by induction by the air-stream and permits the gases to enter and combine with the air-stream without opposition and at full velocity. The end 43 of the heater, at which combustion in the heater begins, opposes the rearward end of the cowl 34 and is somewhat smaller than the cowl so that the latter has an end portion 44 which is left uncovered by the heater. The cowl 34 forms an air-duct 45 which has an outlet 46 to the end 43 of the heater and for which the end portion 44 serves as a direct outlet to the atmosphere. Closures 47 and 48 are provided for the outlets 44 and 46 respectively and may suitably be shutters mounted on suitable tilt-bars 49 operated in unison by a link 50 but oppositely arranged so that when either of the closures is opening the other is closing, to the end that heated air from the duct 45 may be shunted either to the heater 41 or directly to the atmosphere. The volume of preheated air passing through the duct 45 and outlet 46 to the heater 41 may thus be varied to supply "air of combustion" in suitable proportion to the amount of fuel being fed to the heater, independently of the rate of rotation of the air-screw 32.

Because heated air may be supplied from the air-duct 45, it is unnecessary to have the heater 41 provided with the louvres and ducts often found in stack-type orchard heaters, and a simple tube of suitable length, supported by bands 52, will provide a combustion chamber 53. A very suitable burner may be constructed from a number of perforated nipples 54, mounted on a feed ring 55 and having their distal ends open (see Figs. 4 and 5). When liquid fuel is used, it is preferable to pre-heat it, in order to cause vaporization, and therefore we prefer to have a supply conduit 56 include a coil 57 disposed within the combustion chamber 53. It will be understood by those skilled in the use of heaters that when gaseous fuel, such as butane, is used, no coil is required and the supply conduit 56 may lead diretly to the ring 55.

When liquid fuel is used and stored in the stand pipe 11, it is desirable to be able to control the quantity used and the pressure at which it enters the heater. As shown in Fig. 7, a swing joint 59 is fitted to the upper end of the fuel conduit 14 and leads through a swingable conduit 60 to the inlet side of a fuel pump 61 operably connected to the engine 31. The supply conduit 56 connects the outlet side of the pump 61 to the feed ring 55, and is preferably arranged to pass directly over the swing joint 59 at which point a three-way pressure responsive valve 62 is inserted in the conduit 56. A shunt conduit 63 leads from the valve 62 to the swing joint 59 where it rejoins the conduits 14 and 60. The valve 62 which may be of a type commercially available, is arranged to respond to increasing back pressure in the conduit 56 to gradually open to the shunt conduit 63 so that fuel oil will be returned to the stand pipe 11 or simply recirculated through the pump 61. Pressure in the conduit 56 is controlled by a valve 64 disposed in the conduit 56 between the valve 62 and the heater 41.

To ignite the fuel in the heater 41, an ordinary electric spark-gap igniter 66 is mounted in the heater with its spark-gap 67 suitably placed with respect to the nipples 54 to ignite the vaporized or gaseous fuel. Such igniters are available and are not, of themselves, part of this invention. However, instead of connecting the igniter 66 to a distant source of electricity, it may advantageously, in the present invention, be connected by an electric circuit 68 to the ignition system of the engine 31. Methods of connecting a spark coil or spark plug to either the battery or generator of an engine with suitable transformers to obtain a powerful spark, are well known to engine ignition mechanics and will not be elaborated herein. The engine 31 will be started before the heater 41 is ignited, in order to supply preheated air to the heater, and high voltage electricity for a powerful spark may thereby be easily obtained.

As it is desired to cause the air-stream generated by the air-screw 32 and combined with the heat-blast generated by the heater 41 to be propelled in any horizontal direction and to sweep horizontally to spread the heat over the widest possible area and to do so with a minimum of mechanical apparatus, a vertical rudder 71 is mounted on a dorsal vane 72 on the heater 41 so as to have its centered or neutral plane aligned with the air-stream of the air-screw. As the engine 31 is considerably heavier than the heater 41, and the latter therefore is extended considerably further radially from the bearing shaft 17 in order to balance the weight of the apparatus upon the shaft 17, the rudder 71 may be placed on the heater 41 at a distance from the shaft 17 at which it will exert a considerable leverage when turned atwart the air-stream, so as then to cause the unit of heater, engine and air-screw to revolve about the shaft 17. When centered, the rudder acts like a weather vane and tends to maintain the air-stream in whatever direction has been established.

As will have been seen, all of the moving members of the apparatus are parts of the rotatable unit 30 mounted on the shaft 17. As this unit is, in orchard heating, disposed at a height above the tops of the surrounding trees, the controls for the various members are, for convenience, brought to a control panel 74 suspended from the frame 28 by a bracket 75 and therefore rotatable with, and as part of, the unit. The controls may suitably include the gauges and instruments usually accompanying an internal combustion engine, such as the engine ignition switch 76, engine starter button 77, temperature gauge 78, oil pressure gauge and ammeter 79, and tachometer 80, all connected to the engine 31 by suitable wiring or tubing extending along the bracket 75. The engine throttle 81 may be connected to the carburetor of the engine by a linkage or flexible cable 82. The circuit 68, controlling the heater igniter 66, is led through a switch 83. Various means, such as systems of solenoid controls may be used to control the operation of the heater 41 and the rudder 71, but we have found systems of chains and sprockets to be effective and economical. For example, the fuel control valve 64 may be operated by a chain 84 engaging a sprocket 85 on the valve and a sprocket 86 on the control panel and led over suitable guide sprockets 87. Likewise the link 50, operating the closures 47 and 48 to regulate the supply of preheated air to the heater, may be operated by a chain 88, engaging a sprocket 89 connected by a pitman 90 to the link 50 and a sprocket 91 on the control panel. To operate the rudder 71, we may use a system of tiller bars as shown in Fig. 8. A bar 92 is connected to a hand wheel 93 on the control panel by a chain 94, which may be crossed so rotation of the top of the hand wheel to the left, or counterclockwise, will move the rudder 71 to the right and cause the burner 41 to swing to the left as viewed by an operator standing in front of the control panel. The bar 92 is mounted on the lower end of a shaft 95 which extends upwardly through the heater 41 in the relatively cool zone between the closure 48 and the burner feed ring 55 and which has at its upper end another transverse bar 96. The bar 96 is connected by cables 97 to a tiller bar 98 on the rudder 71. By conducting the control from below the heater 41 to above by means of the axially disposed vertical shaft 95, substantially 180° of swing is permitted to the rudder 71.

To start our wind-generating and heating apparatus in operation, the operator first closes the fuel valve 64 by means of the sprocket 86, starts the engine 31 and moves the shutter control 91 to close the closure 47 and open the closure 48, thereby warming the heater 41 as the engine 31 warms up. The rudder control handwheel 93 may be centered to bring the rudder 71 to its central stabilizing position and thus to prevent the unit 30 from rotating while the operator is working at the control panel. When the heater 41 has been sufficiently pre-heated, the operator opens the fuel valve 65. If liquid fuel is in use, the fuel will have hitherto been returned to the standpipe 11 through the three-way valve 62. Fuel now being admitted to the heater through the burner nipples 54, and being partly vaporized by the pre-heating of the heater, the operator may ignite the fuel by closing the switch 83. When a satisfactory flame has been attained by adjustment of the fuel valve 65 and the closures 47 and 48, the operator may start the unit 30 rotating by moving the rudder 71 to one side or the other. If it is desired to blow a blast of heat in any one direction for a period of time, the unit 30 may be moved by hand to discharge in that direction by means of the bracket 75 which extends downwardly to support the control panel 74 at a level conveniently adjacent to the ground and which serves as a handle for that purpose. Rotation of the unit 30 may also be arrested, for the purpose of adjusting any of the controls, by grasping the bracket 75 or the control panel 74.

Obviously our invention is subject to numerous modifications in structure and arrangement; it is therefore to be understood that the foregoing description and the accompanying drawings are for illustrative purposes and that the spirit and scope of the invention is to be interpreted as set forth in the appended claims.

We claim:

1. Apparatus for heating out-of-door areas such as orchards and the like, comprising: an upwardly extending support; a heat-and-wind generating unit mounted rotatably upon said support at a level above said orchard or like area and including an air-cooled internal combustion engine, an air-screw driven by said engine, and an elongated tubular member adapted to serve as a combustion chamber and arranged to discharge substantially co-axially with the air-stream of said air-screw; means for conducting air heated by said engine to said tubular member as air of combustion; means coaxial with the axis of rotation of said unit for supplying fuel to said tubular member; a rudder carried by said unit in the path of said air-stream and spaced from the axis of rotation of said unit so as to be capable of causing rotation of said unit by resistance to said air-stream; and means for regulating the supply of heated air to said tubular member.

2. In apparatus for heating out-of-door areas such as orchards and the like, the combination of: an engine, an air-screw driven by said engine; an elongated tubular member adapted to serve as a combustion chamber; said member being substantially axially aligned with the blast of said air-screw and forming with said air-screw and said engine a unit adapted to cause horizontal transportation of heat generated by said tubular member by the air-blast of said air-screw; a support member supporting said unit at a level above said orchard or like area and adapted to serve as a reservoir for fuel for said tubular member; and means operably connected to said engine for pumping fuel from said support member to said tubular member.

3. In apparatus for heating out-of-door areas such as orchards and the like, inclusive of a heater adapted to burn liquid fuel, an engine, and means to supply to said heater a variable volume of air of combustion preheated by said engine: a support member supporting said engine and said heater and adapted to serve as a reservoir for fuel for said heater; a pump operably connected to said engine; a first conduit connecting said reservoir to the inlet side of said pump; a second conduit connecting the outlet side of said pump to said heater; a return conduit connecting said second conduit to said reservoir; a three-way valve at the junction of said second conduit and said return conduit responsive to pressure in said second conduit to shunt a variable quantity of fuel from said second conduit to said return conduit; and a valve in said second conduit between said three-way valve and said heater operable to impress a variable back-pressure in said second conduit upon said three-way valve.

4. In apparatus for heating out-of-door areas such as orchards and the like, the combination of: a tubular heater internally adapted for use as a combustion chamber; an air-cooled internal combustion engine and an air-screw driven thereby, said heater being arranged to deliver its products of combustion into the path of the air-blast of said air-screw; and an air-duct connecting the cooling system of said engine to the inlet end of said heater for the delivery of preheated air to said heater as air of combustion.

5. In apparatus for heating out-of-door areas such as orchards and the like, the combination of: an air-cooled internal combustion engine and an air-screw driven thereby, disposed at an elevation above ground level so as to deliver an air blast above the level of said orchard or like area; a tubular heater having a combustion chamber and a discharge stack substantially axially aligned with the path of said air blast so as to discharge into and in the direction of said air blast on the discharge side of said air-screw; means for conducting air preheated by the cooling system of said engine into the inlet end of said heater as air of combustion; means for diverting a portion of said preheated air away from said heater to the atmosphere; and means for controlling said diverting means so as to regulate the ratio of said diverted portion to the preheated air entering said heater.

6. In apparatus for heating out-of-door areas such as orchards and the like, the combination of: an air-cooled internal combustion engine and an air-screw driven thereby, disposed at an elevation above ground level so as to deliver an air blast above the level of said orchard or like area; a tubular heater having a combustion chamber and a discharge stack substantially axially aligned with the path of said air blast so as to discharge into and in the direction of said air blast on the discharge side of said air-screw; an air-duct for conducting air heated by the cooling system of said engine, having an outlet into said heater and another outlet to the atmosphere; closures for each of said outlets; linkage connecting said closures so arranged that partial closure of either outlet is concomitant with a corresponding opening of the other of said outlets; and means for moving said closures between closed and open positions, so as to regulate the proportion of the air preheated by said engine which may be supplied to said heater as air of combustion.

7. The method of heating out-of-door areas such as orchards and the like, which comprises: generating a horizontal air stream by means of a generator also generating waste heat; utilizing said waste heat to heat a portion of said air stream; generating a combustion blast aligned with said air stream; utilizing air from said heated portion of said air stream as air of combustion to support said combustion blast, whereby to intensify the temperature and volume of said combustion blast; and combining said combustion blast with the unheated portion of said air stream at the discharge side of said generator whereby to provide a heated horizontal blast in which the heat of said combustion blast is propelled by said air stream.

8. The method of heating out-of-door areas such as orchards and the like, which comprises: generating a horizontal air stream by means of a generator also generating waste heat; utilizing said waste heat to heat a portion of said air stream; generating a combustion blast aligned with said air stream; utilizing air from said heated portion of said air stream as air of combustion to support said combustion blast, whereby to intensify the temperature and volume of said combustion blast; deflecting a remaining portion of said air stream to cause horizontal rotation of said generator responsively to aerodynamic reaction from said deflected portion; and combining said combustion blast with the unheated portion of said air stream at the discharge side of said generator, whereby to provide a heated horizontally rotating blast in which the heat of said combustion blast is propelled by said air stream.

9. Apparatus for heating out-of-door areas such as orchards and the like, comprising: a heat-generating engine; an air-screw driven by said engine; and an elongated heater having an internal combustion chamber and having a discharge stack arranged substantially coaxially with said air-screw and discharging on the discharge side of said air-screw; and duct means for dividing the air-blast of said air-screw into a portion in contact with said engine so as to be heated by heat transfer therefrom and an unheated portion free to flow coaxially with said heater in the direction of the discharge of said heater as carrier air for the products of said heater.

10. Apparatus as set forth in claim 9 in which said duct means is further divided and arranged to deliver a portion of said heated air to the inlet end of said heater as air of combustion, and to return the remainder of said heated air to the stream of said free flowing portion.

11. Apparatus as set forth in claim 10 inclusive of adjustable baffles for regulating the relative proportions of said further divided portions of said heated air.

12. Apparatus as set forth in claim 10 in which said engine is air-cooled but devoid of water-jacket, whereby said heater may be operated with said engine idle, said duct then conducting cold air in contact with said engine by induction from said heater.

13. Apparatus for heating out-of-door areas such as orchards and the like, comprising: a heat-generating engine; an air-screw driven by said engine; an elongated heater having an internal combustion chamber and having a discharge stack arranged substantially co-axially with said air-screw and discharging on the discharge side of said air-screw at a position substantially spaced from the origin of combustion in said chamber, whereby the discharge blast of said heater is pushed outwardly by a relatively cool parallel blast from said air-screw and has substantial initial velocity; and a cowl on said engine communicating with the suction side of said air-screw so that a portion of the blast of said air-screw may receive heat by transfer from said engine, said heated portion then mingling with the products of said heater.

GENE B. FETROW.
JOHN B. BROWNING.

REFERENCES CITED

The following references are of record in the file of this patent:

UNITED STATES PATENTS

| Number | Name | Date |
|---|---|---|
| 1,357,314 | Cobb | Nov. 2, 1920 |
| 2,041,969 | Seymour | May 26, 1936 |
| 2,153,900 | Taber | Apr. 11, 1939 |
| 2,231,454 | Saxe | Feb. 11, 1941 |
| 2,463,851 | Browne | Mar. 8, 1949 |